United States Patent
Um et al.

(10) Patent No.: US 12,518,418 B2
(45) Date of Patent: Jan. 6, 2026

(54) METHOD OF GENERATING A HUMAN MODEL AND DEVICE THEREFOR

(71) Applicants: Electronics and Telecommunications Research Institute, Daejeon (KR); Konkuk University Industrial Cooperation Corp, Seoul (KR)

(72) Inventors: Gi Mun Um, Daejeon (KR); Hee Kyung Lee, Daejeon (KR); Won Jun Kim, Seoul (KR); Jeong Hwan Kim, Seoul (KR)

(73) Assignees: Electronics and Telecommunications Research Institute, Daejeon (KR); Konkuk University Industrial Cooperation Corp, Seoul (KR)

( * ) Notice: Subject to any disclaimer, the term of this patent is extended or adjusted under 35 U.S.C. 154(b) by 245 days.

(21) Appl. No.: 18/509,647

(22) Filed: Nov. 15, 2023

(65) Prior Publication Data

US 2024/0161336 A1    May 16, 2024

(30) Foreign Application Priority Data

Nov. 15, 2022 (KR) .................. 10-2022-0152692

(51) Int. Cl.
*G06T 7/73* (2017.01)
*G06T 7/50* (2017.01)
(Continued)

(52) U.S. Cl.
CPC .................. *G06T 7/73* (2017.01); *G06T 7/50* (2017.01); *G06T 17/00* (2013.01);
(Continued)

(58) Field of Classification Search
None
See application file for complete search history.

(56) References Cited

U.S. PATENT DOCUMENTS 11,587,350 B2 *  2/2023  Amat Roldan ...... G06V 40/103
12,205,311 B1 *  1/2025  Karagoz .............. G06V 10/751
(Continued)

FOREIGN PATENT DOCUMENTS

JP    2020-198019 A    12/2020
KR    10-1906431 B1    10/2018
(Continued)

OTHER PUBLICATIONS

Zhang, Hongwen, et al. "Learning 3d human shape and pose from dense body parts." IEEE Transactions on Pattern Analysis and Machine Intelligence 44.5, 2020. (pp. 2610-2627).
(Continued)

*Primary Examiner* — Edward Martello
(74) *Attorney, Agent, or Firm* — NSIP Law

(57) ABSTRACT

A method of generating a human model according to the present disclosure may include generating a plurality of feature maps from an input image, wherein the plurality of feature maps include a body center map, a part index map, a body part map and a parameter map, generating a part-attentive feature configured with feature maps for each body part based on the part index map and the body part map, readjusting the part-attentive feature based on the parameter map and generating a pose parameter based on the readjusted part-attentive feature.

18 Claims, 6 Drawing Sheets
(3 of 6 Drawing Sheet(s) Filed in Color)

(51) Int. Cl.
*G06T 17/00* (2006.01)
*G06V 10/77* (2022.01)
*G06V 10/82* (2022.01)
*G06V 40/10* (2022.01)

(52) U.S. Cl.
CPC .......... *G06V 10/7715* (2022.01); *G06V 10/82* (2022.01); *G06V 40/10* (2022.01); *G06T 2207/20081* (2013.01); *G06T 2207/20084* (2013.01); *G06T 2207/30196* (2013.01)

(56) References Cited

U.S. PATENT DOCUMENTS

| 2014/0228123 A1* | 8/2014 | Polzin | A63F 13/428 |
| | | | 463/36 |
| 2022/0051440 A1 | 2/2022 | Fisch | |
| 2022/0101602 A1* | 3/2022 | Serrat | G06F 18/214 |
| 2022/0262024 A1* | 8/2022 | Sun | G06T 17/00 |

FOREIGN PATENT DOCUMENTS

| KR | 10-2198470 B1 | 1/2021 |
| KR | 10-2022-0098895 A | 7/2022 |

OTHER PUBLICATIONS

Wang et al. "CenterMask: single shot instance segmentation with point representation" *Proceedings of the IEEE/CVF conference on computer vision and pattern recognition* 2020 (pp. 9313-9321).

* cited by examiner

<Input image>

<Output image>

METHOD OF GENERATING A HUMAN MODEL AND DEVICE THEREFOR

This application claims the benefit under 35 USC § 119(a) of Korean Patent Application No. 10-2022-0152692 filed on Nov. 15, 2022, in the Korean Intellectual Property Office, the entire disclosure of which is incorporated herein by reference for all purposes.

TECHNICAL FIELD

The present disclosure relates to a method of generating a three-dimensional human model from a single image and a device therefor.

BACKGROUND ART

With the development of deep learning technology, research on generating a three-dimensional model of an object by using a single image is actively underway. In particular, a method of deriving a pose parameter and a shape parameter of a parametric human model through a neural network derives excellent performance.

DISCLOSURE

Technical Problem

The present disclosure is to provide a method of generating a human model by extracting a feature map for each body part and a device therefor.

The present disclosure is to provide a method of hierarchically deriving a pose parameter by considering a kinematic joint relationship and a device therefor.

The technical objects to be achieved by the present disclosure are not limited to the above-described technical objects, and other technical objects which are not described herein will be clearly understood by those skilled in the pertinent art from the following description.

Technical Solution

A method of generating a human model according to the present disclosure includes generating a plurality of feature maps from an input image, wherein the plurality of feature maps include a body center map, a part index map, a body part map and a parameter map, generating a part-attentive feature configured with feature maps for each body part based on the part index map and the body part map, readjusting the part-attentive feature based on the parameter map and generating a pose parameter based on the readjusted part-attentive feature.

A device for a device of generating a human model according to the present disclosure includes a feature map generation unit which generates a plurality of feature maps from an input image, wherein the plurality of feature maps include a body center map, a part index map, a body part map and a parameter map, a part-attentive feature generation unit which generates a part-attentive feature configured with feature maps for each body part based on the part index map and the body part map, a part-attentive feature adjustment unit which readjusts the part-attentive feature based on the parameter map and a reconstruction unit which generates a pose parameter based on the readjusted part-attentive feature.

In a method and a device of generating a human model according to an embodiment of the present disclosure, the part-attentive feature may be acquired through a step of sampling the part index map based on center information extracted from the body center map. Specifically, it is characterized that the part-attentive feature is acquired through a matrix product operation based on a sampled part index map and the body part map.

In a method and a device of generating a human model according to an embodiment of the present disclosure, when the number of channels of the part index map is different from the number of channels of the body part map, the number of channels of the sampled part index map may be adjusted according to the number of channels of the body part map.

In a method and a device of generating a human model according to an embodiment of the present disclosure, readjustment of the part-attentive feature includes first readjustment and second readjustment, the first readjustment may be performed based on a matrix product operation between the part-attentive feature and the parameter map and the second readjustment may be performed based on a matrix product operation between the part-attentive feature and a parameter map that the number of channels is adjusted.

In a method and a device of generating a human model according to an embodiment of the present disclosure, the pose parameter may be acquired per body part and a first pose parameter for a first body part may be acquired based on a feature map corresponding to the first body part in a first readjusted part-attentive feature acquired by the first readjustment.

In a method and a device of generating a human model according to an embodiment of the present disclosure, the first pose parameter may be acquired by projecting the feature map onto a linear layer corresponding to the first body part.

In a method and a device of generating a human model according to an embodiment of the present disclosure, when a parent body part of the first body part (hereinafter, referred to as a second body part) exists, the first pose parameter may be acquired by further using a second pose parameter of the second body part.

In a method and a device of generating a human model according to an embodiment of the present disclosure, the first pose parameter may be acquired by combining the second pose parameter with a feature map corresponding to the first body part and projecting it onto a linear layer corresponding to the first body part.

In a method and a device of generating a human model according to an embodiment of the present disclosure, a step of acquiring a shape parameter may be further performed based on a second readjusted part-attentive feature acquired by the second readjustment.

The features briefly summarized above for the present disclosure are just an exemplary aspect of a detailed description of the present disclosure described below, and do not limit a scope of the present disclosure.

Technical Effect

According to the present disclosure, a three-dimensional human model may be generated from a single image.

According to the present disclosure, even when part of a subject's body is occluded, a three-dimensional human model may be generated precisely.

According to the present disclosure, by using a kinematic joint relationship, the accuracy of pose prediction may be increased.

Effects achievable by the present disclosure are not limited to the above-described effects, and other effects which are not described herein may be clearly understood by those skilled in the pertinent art from the following description.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED EMBODIMENTS

Figure 1:
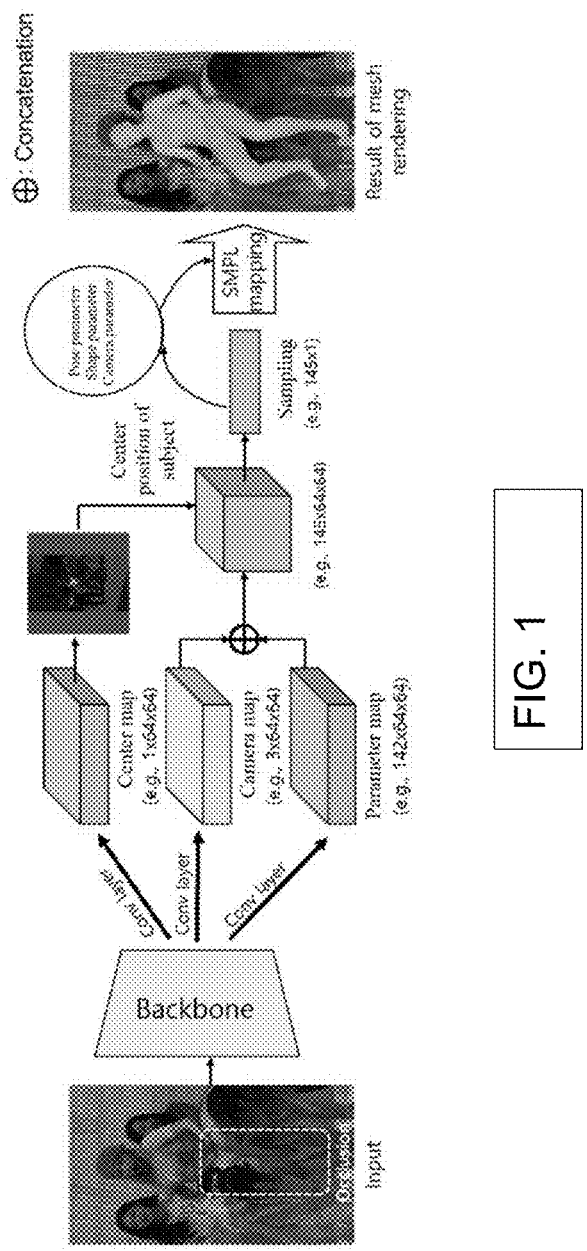
FIG. 1 is a diagram illustrating a neural network structure for generating a parametric human model.

As the present disclosure may make various changes and have multiple embodiments, specific embodiments are illustrated in a drawing and are described in detail in a detailed description. But, it should be understood that the present disclosure is not limited to a specific embodiment and includes all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from another element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement the essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

FIG. 1 is a diagram illustrating a neural network structure for generating a parametric human model.

When an image is input to a backbone neural network, a feature map including a center map showing a center position of a subject in a form of a probability map, a camera map showing a characteristic of a camera, a parameter map for reconstructing a pose parameter, etc. is output.

As above, without separately detecting a region of a subject in an image through a center map which predicts a center position of a subject in a form of a probability map and sampling at a center position, a pose parameter and a shape parameter for a parametric human model may be predicted.

But, as above, when a pose is predicted based on a global pose parameter for the entire body area, if occlusion of a subject occurs, as in a result of mesh rendering shown in FIG. 1, a case occurs in which a result of generating a parametric human model is unnatural.

Accordingly, the present disclosure proposes a neural network structure which learns a relationship between body parts and enables a strong operation even when a subject is occluded.

Figure 2:
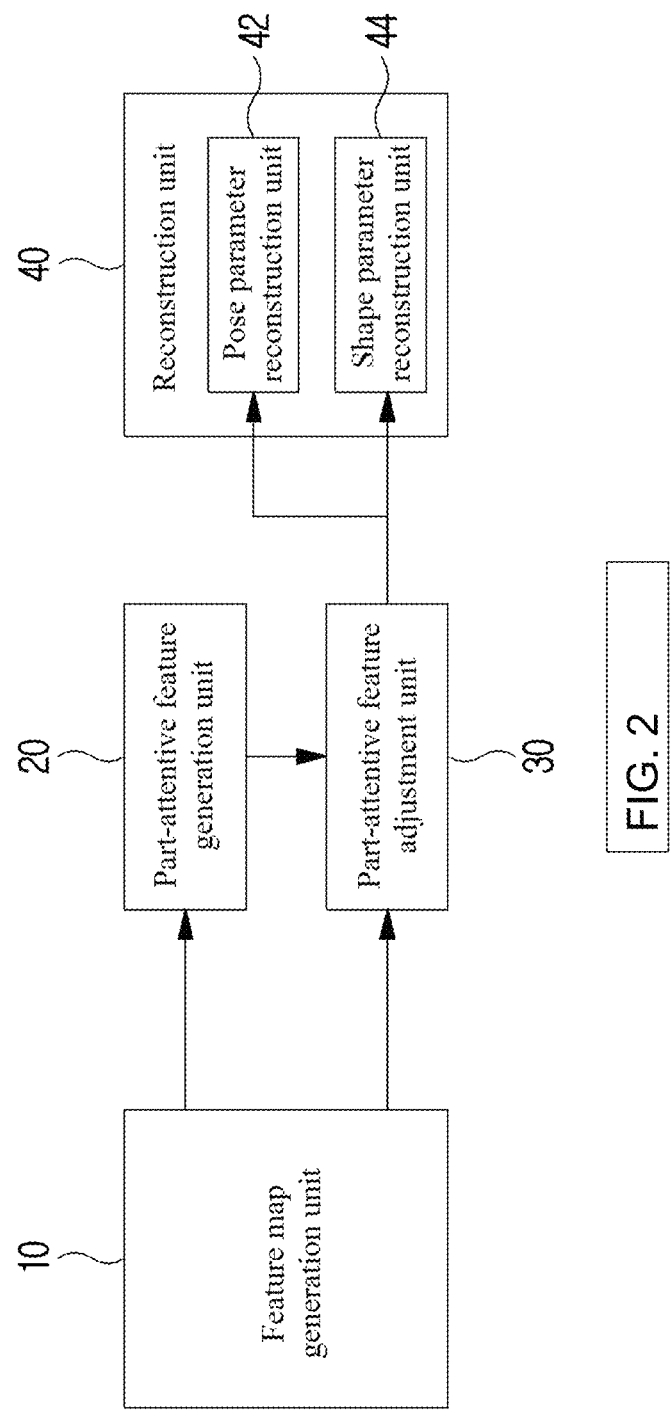
FIG. 2 shows a block diagram of a neural network according to an embodiment of the present disclosure.
Figure 3:
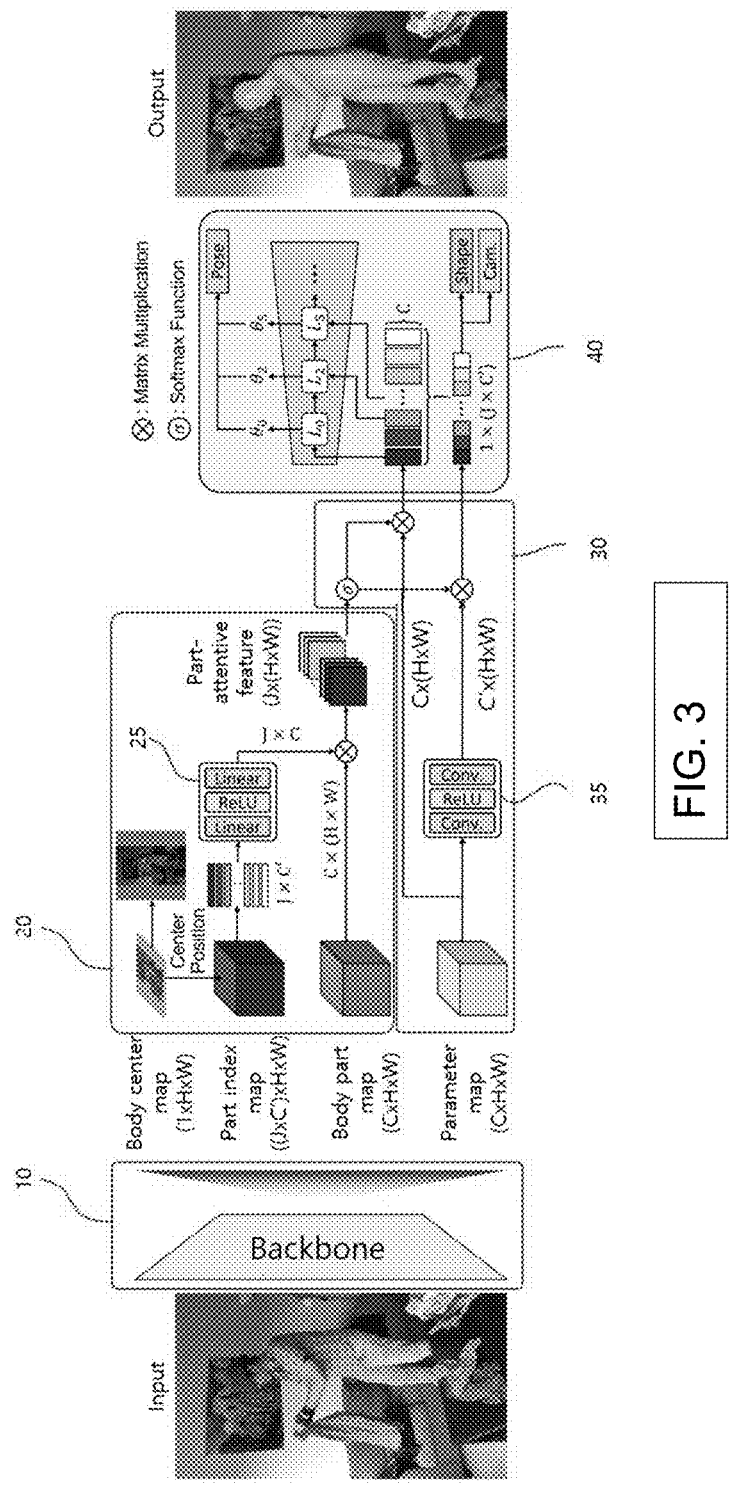
FIG. 3 shows a detailed structure of a neural network according to an embodiment of the present disclosure.

FIG. 2 shows a block diagram of a neural network according to an embodiment of the present disclosure and FIG. 3 shows a detailed structure of a neural network according to an embodiment of the present disclosure.

In reference to FIGS. 2 and 3, a neural network according to the present disclosure may include a feature map generation unit 10, a part-attentive feature generation unit 20, a part-attentive feature adjustment unit 30 and a reconstruction unit 40.

When an image is input, a feature map generation unit 10 generates and outputs a plurality of feature maps from an input image. A feature map generation unit 10 may be configured with a backbone neural network. A backbone neural network performs a role of compressing an image given as input into a feature space through repetitive convolution operation and nonlinear activation. In an example, a backbone neural network may be implemented as ResNet or HRNet, etc.

A feature map generation unit 10 generates a plurality of feature maps from an input image. Specifically, a feature map generation unit 10 may generate a body center map, a part index map, a body part map and a parameter map from an input image.

A body center map includes feature data regarding a center position of a subject in an input image. Specifically, a body center map may be a probability map which represents a center position of a subject as probability distribution. A body center map may be data expressed in one channel. In FIG. 3, a body center map is illustrated as a H×W-sized feature map.

A part index map includes feature maps which specify each body part of a subject. Here, a body part represents a part such as a torso, a neck, a head, an upper arm, a lower arm, a hand, a thigh, a leg, a foot, etc. and the part index map may be feature data which specifies a position of each body part. Of course, embodiments described below may be applied even when a body part is divided in more detail than those listed above or when a body part is divided into larger parts than those listed above. In an example, a part index map may include feature data for J body parts and here, J may be a natural number equal to or greater than 1.

A part index map may include a feature map having at least one channel per body part. In an example, when the number of body parts is J, as in an example shown in FIG. 3, a part index map may be configured with C'×H×W-sized feature maps for each of J body parts.

Here, C', the number of channels, may be manually adjusted by a user or may be adaptively configured according to an image type or a type of a subject.

Based on a body center map, after acquiring information on a center position of a subject, sampling for a part index map may be performed based on a center position. As a result, as in an example shown in FIG. 3, a J×C'-sized sampled body center map may be derived.

A body part map includes feature data related to a body characteristic of a subject. A body part map may be a feature map having at least one channel. In an example, as in an example shown in FIG. 3, a body part map may be a C×H×W-sized feature map.

Here, C, the number of channels, may be manually adjusted by a user or may be adaptively configured according to an image type or a type of a subject.

A parameter map includes feature data for estimating a pose and a shape of a parametric human model. A parameter map may have the same number of channels as a body part map. In an example, as in an example shown in FIG. 3, a parameter map may be a C×H×W-sized feature map.

A part-attentive feature generation unit 20 uses feature maps generated through a feature map generation unit 10 to generate a part-attentive feature. A part-attentive feature may be data for specifying a body part needed to generate a parametric human model and determining importance, etc. per body part when a pose is reconstructed.

A part-attentive feature generation unit 20 may generate a part-attentive feature based on a part index map and a body part map. Specifically, as in an example shown in FIG. 3, a part-attentive feature may be generated by a matrix product operation between a part index map and a body part map. Here, a part index map may be sampled based on a center position of a subject.

A part-attentive feature output by the matrix product operation may include a feature map for each of J body parts included in a part index map. In an example, in FIG. 3, it was illustrated a part-attentive feature includes a H×W-sized feature map for each of J body parts.

In this case, when the number of channels of a part index map is different from that of a body part map, it is necessary to match the number of channels of two feature maps above for a matrix product operation. In an example, when C', the number of channels of a part index map, is greater than C, the number of channels of a body part map, as in an example shown in FIG. 3, C', the number of channels of a part index map, may be adjusted to C, the number of channels of a body part map, by sampling a part index map through a channel adjustment layer (specifically, a channel decrease (or, bottleneck) layer, 25).

A part-attentive feature adjustment unit 30 recalibrates a part-attentive feature generated in a part-attentive feature generation unit 20. Specifically, a part-attentive feature may be readjusted by a matrix product operation between a part-attentive feature and a parameter map.

In this case, readjustment may include first readjustment for acquiring a pose parameter and second readjustment for acquiring a shape parameter.

First readjustment may be performed based on a matrix product operation between a part-attentive feature and a parameter map.

Second readjustment may be performed based on a matrix product operation between a part-attentive feature and a parameter map that the number of channels is adjusted. Specifically, a matrix product operation may be performed after the number of channels of a parameter map is adjusted equally to the number of channels of a part index map. In an example, when C', the number of channels of a part index map, is greater than C, the number of channels of a parameter map, as in an example shown in FIG. 3, the number of channels of a parameter map may be adjusted from C to C' through a channel adjustment layer (specifically, a channel increase layer, 35).

For readjustment, the first readjustment and the second readjustment may be performed after applying a softmax function to a part-attentive feature. In an example, in an embodiment related to the first readjustment and the second readjustment, a part-attentive feature may be acquired by applying a softmax function.

A reconstruction unit 40 includes a pose parameter reconstruction unit 42 and a shape parameter reconstruction unit 44.

A pose parameter reconstruction unit 42 acquires a pose parameter for generating a parametric human model based on a first readjusted part-attentive feature. A pose parameter may be acquired per body part, and through a pose parameter per body part, a characteristic related to at least one of a position per body part, mobility per body part, a movement direction per body part or a rotation direction per body part for a parametric human model may be determined. In other words, by combining pose parameters of each body part, a final 3D pose of a parametric human model may be determined.

A shape parameter reconstruction unit 44 acquires a shape parameter of a parametric human model based on a second readjusted part-attentive feature. A shape parameter may be used to determine a body type, etc. of a parametric human model.

Furthermore, a shape parameter reconstruction unit 40 may additionally acquire a camera parameter. A camera parameter may be used to reconstruct at least one of a position or a size of a parametric human model.

A pose parameter may be acquired by considering a kinematic joint relationship (kinetic chain) per body part.

Specifically, when a part-attentive feature includes feature data for J body parts, a first readjusted part-attentive feature parameter includes J feature maps. By projecting each of J feature maps onto a linear layer corresponding to a corresponding body part, $\theta$, a pose parameter corresponding to a corresponding body part, may be acquired.

In this case, according to a joint relationship, when there is a parent joint or a body part (or a parent body part), a pose parameter for the body part may be generated by further using a projection result (i.e., a pose parameter) of the parent joint (or parent body part), along with a feature map of the body part.

Figure 4A:
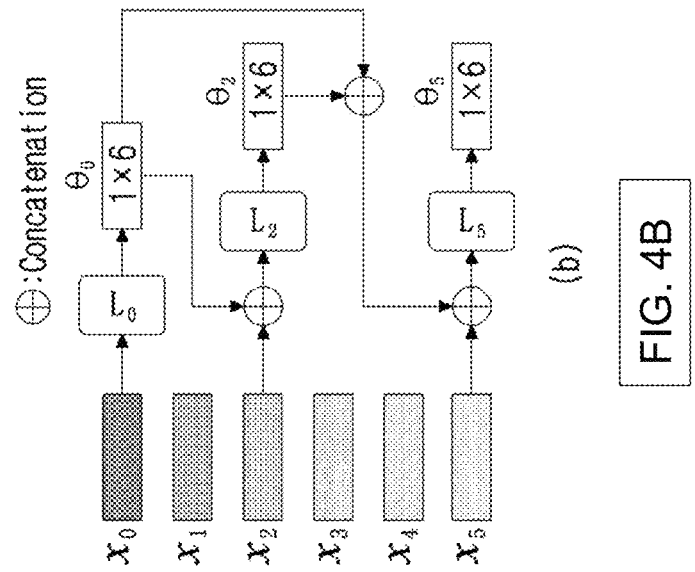
FIGS. 4A and 4B describe an example in which a pose parameter is acquired by considering a joint relationship.
Figure 4B:
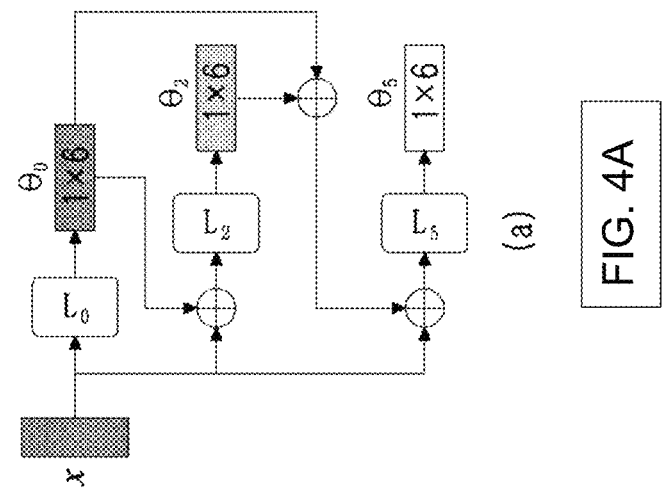

FIG. 4 is a diagram for describing an example in which a pose parameter is acquired by considering a joint relationship.

FIG. 4(*a*) shows an example for a case in which the number of input feature maps is 1 and FIG. 4(*b*) shows an example for a case in which a feature map for each of J body parts is used as input.

In this embodiment, it is assumed that a kinematic joint relationship between body parts is defined based on a torso. Furthermore, it is assumed that an arm is connected to a torso and a hand is connected to an arm.

According to the connection relationship, there is no parent body part for a torso. In this case, a pose parameter for a torso may be acquired without using a pose parameter for other body parts.

In an example, as in an example shown in FIG. 4(*a*), when the number of input feature maps is 1, $\theta 0$, a pose parameter for a torso, may be acquired by projecting feature map x onto linear layer L0 corresponding to a torso.

On the other hand, as in an example shown in FIG. 4(*b*), when there is a feature map per body part, $\theta 0$, a pose parameter for a torso, may be acquired by projecting feature map x0 corresponding to a torso onto linear layer L0 corresponding to a torso.

According to the connection relationship, an arm is connected to a torso. Accordingly, a pose parameter for an arm is acquired by using a pose parameter for a torso, a parent body part.

In an example, as in an example shown in FIG. 4(*a*), when the number of input feature maps is 1, $\theta 2$, a pose parameter for an arm, may be acquired by projecting data acquired by joining pose parameter $\theta 0$ for a torso to feature map x onto linear layer L2 corresponding to an arm.

On the other hand, as in an example shown in FIG. 4(*b*), when there is a feature map per body part, $\theta 2$, a pose parameter for an arm, may be acquired by projecting data acquired by joining pose parameter $\theta 0$ for a torso to feature map ×2 for an arm onto linear layer L2 corresponding to an arm.

According to the connection relationship, a hand is connected to an arm. Accordingly, a pose parameter for a hand is acquired by using a pose parameter for an arm, a parent body part.

In an example, as in an example shown in FIG. 4(*a*), when the number of input feature maps is 1, $\theta 5$, a pose parameter for a hand, may be acquired by projecting data acquired by joining pose parameter $\theta 2$ for an arm to feature map x onto linear layer L5 corresponding to a hand.

On the other hand, as in an example shown in FIG. 4(*b*), when there is a feature map per body part, $\theta 5$, a pose parameter for a hand, may be acquired by projecting data acquired by joining pose parameter $\theta 2$ for an arm to feature map ×5 for a hand onto linear layer L5 corresponding to a hand.

A reconstruction process as above is performed per body part, and accordingly, a pose parameter may be generated per body part.

More or fewer pose parameters than J, the number of feature maps per body part included in a part-attentive feature, may be generated.

In an example, a pose parameter for N body parts may be acquired by subdividing a body part into more parts than J, the number of body parts that feature data is acquired. In this case, when there is no feature map corresponding to a specific body part, as in an example shown in FIG. 4(*a*), data acquired by joining a feature map of a parent body part and a pose parameter of a parent body part may be input to a linear layer corresponding to the specific body part to acquire a pose parameter for the specific body part.

A shape parameter and a camera parameter for a parametric human model may be acquired by performing linear projection for a second part-attentive feature.

Figure 5:
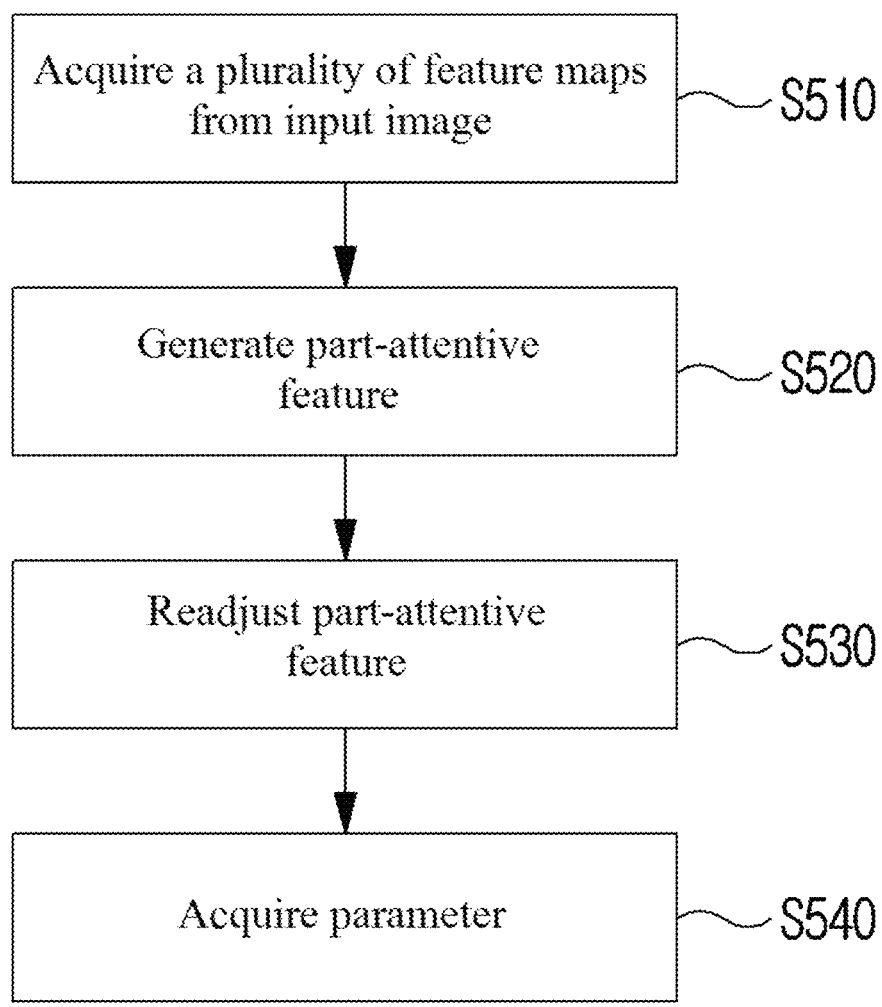
FIG. 5 is a flowchart of a pose and shape parameter prediction method for generating a parametric human model according to an embodiment of the present disclosure.

FIG. 5 is a flowchart of a pose and shape parameter prediction method for generating a parametric human model according to an embodiment of the present disclosure.

First, an input image may be input to a neural network to acquire a plurality of feature maps, specifically, a body center map, a part index map, a body part map and a parameter map from an input image S510.

And, based on a part index map and a body part map, a part-attentive feature including feature maps per body part is generated S520. Specifically, a part-attentive feature may be acquired by a matrix product operation between a part index map and a body part map. In this case, when the number of channels of a part index map is different from the number of channels of a body part map, a process of configuring the number of the two channels to be the same may be accompanied.

Next, a part-attentive feature is readjusted S530. The readjustment may be performed based on a parameter map and in addition, the readjustment may include first readjustment and second readjustment. First readjustment may be performed based on a matrix product operation between a part-attentive feature and a parameter map and second readjustment may be performed based on a matrix product operation between a part-attentive feature and a parameter map that the number of channels is adjusted. In this case, the first readjustment and the second readjustment may be performed based on a part-attentive feature to which a softmax function is applied.

A readjusted part-attentive feature may be used to acquire a parameter for generating a parametric human model S540. Specifically, a pose parameter for a parametric human model may be acquired by using a first readjusted part-attentive feature acquired through first readjustment and a shape parameter and/or a camera parameter for a parametric human model may be acquired by using a second readjusted part-attentive feature acquired through second readjustment.

In this case, a pose parameter may be acquired per body part. Furthermore, when there is a parent body part of a body part, a pose parameter of the body part may be acquired by using a pose parameter of a parent body part.

A parametric human model may be generated by using a parameter acquired in S540 above.

A backbone neural network proposed in FIG. 2 was learned by using the following method.

First, a backbone neural network was learned by using a benchmark dataset built for 2D pose prediction. Here, a benchmark dataset includes Human3.6M, MPI-INF-3DHP, COCO, LSP, MPII, MuCo-3DHP and Crowdpose.

Figure 6:
FIG. 6 illustrates a result of generating a human model using a neural network structure proposed in the present disclosure.
Figure 6:
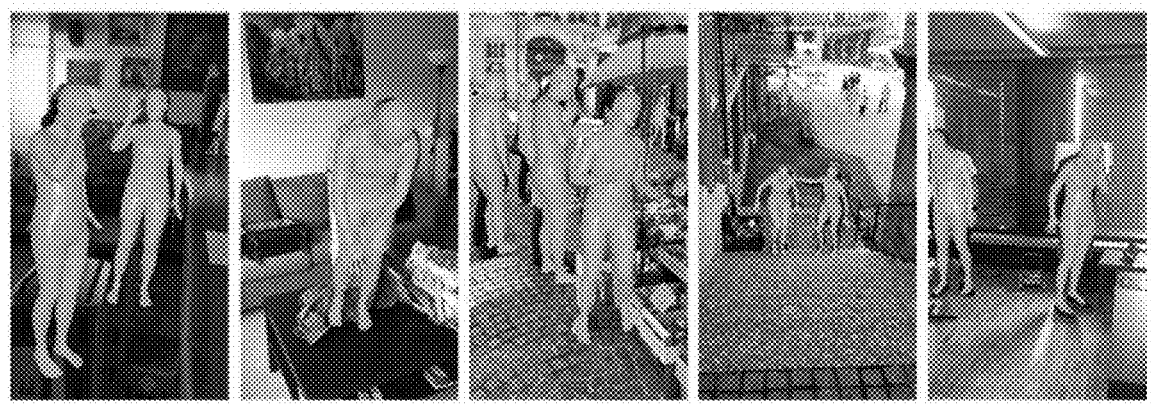

The learned backbone neural network is used to acquire a parametric human model prediction result as in FIG. 6 below.

For a learned backbone neural network, after performing fine tuning based on a 3DPW dataset, performance evaluation for a 3DPW test set was performed. In this case, it was confirmed that a neural network structure shown in FIGS. 2 and 3 improves performance as in Table 1, compared to a neural network structure shown in FIG. 1.

TABLE 1

| Methods | MJPJE | PA-MJPJE |
| --- | --- | --- |
| First Neural Network Structure (FIG. 1) | 76.7 | 47.3 |
| Second Neural Network Structure (FIG. 2) | 74.2 | 45.1 |

The performance evaluation was measured based on the accuracy of joint position prediction, i.e., an average value for a difference between a joint position of a correct model and a joint position of a prediction ((MJPJE) in Table 1). In addition, the accuracy of a joint position was also evaluated together after normalizing a head position (PA-MJPJE in Table 1).

An element described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by software and software may be recorded in a recording medium. An element, a function and a process described in illustrative embodiments may be implemented by a combination of hardware and software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, an element, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. An element of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

The invention claimed is:

1. A method for generating a human model, the method comprising:
   generating a plurality of feature maps from an input image, wherein the plurality of feature maps include a body center map, a part index map, a body part map and a parameter map;
   generating a part-attentive feature configured with feature maps per body part based on the part index map and the body part map;
   readjusting the part-attentive feature based on the parameter map; and
   generating a pose parameter based on the readjusted part-attentive feature.

2. The method of claim 1, wherein:
   generating the part-attentive feature includes sampling the part index map based on center information extracted from the body center map,
   the part-attentive feature is acquired through a matrix product operation based on a sampled part index map and the body part map.

3. The method of claim 2, wherein:
   when a number of channels of the part index map is different from the number of channels of the body part map, the number of channels of the sampled part index map is adjusted according to the number of channels of the body part map.

4. The method of claim 1, wherein:
   readjustment of the part-attentive feature includes first readjustment and second readjustment,
   the first readjustment is performed based on a matrix product operation between the part-attentive feature and the parameter map,
   the second readjustment is performed based on the matrix product operation between the part-attentive feature and the parameter map that a number of channels is adjusted.

5. The method of claim 4, wherein:
   the pose parameter is acquired per body part,
   a first pose parameter for a first body part is acquired based on the feature map corresponding to the first body part in a first readjusted part-attentive feature acquired by the first readjustment.

6. The method of claim 5, wherein:
   the first pose parameter is acquired by projecting the feature map onto a linear layer corresponding to the first body part.

7. The method of claim 5, wherein:
   when a parent body part of the first body part (hereinafter, referred to as a second body part) exists,
   the first pose parameter is acquired by further using a second pose parameter of the second body part.

8. The method of claim 7, wherein:
   the first pose parameter is acquired by combining the second pose parameter with the feature map corresponding to the first body part and projecting it onto a linear layer corresponding to the first body part.

9. The method of claim 5, wherein:
   the method further includes acquiring a shape parameter based on a second readjusted part-attentive feature acquired by the second readjustment.

10. A device for generating a human model, the device comprising:
    a feature map generation unit which generates a plurality of feature maps from an input image, wherein the plurality of feature maps include a body center map, a part index map, a body part map and a parameter map;
    a part-attentive feature generation unit which generates a part-attentive feature configured with feature maps per body part based on the part index map and the body part map;
    a part-attentive feature adjustment unit which readjusts the part-attentive feature based on the parameter map; and
    a reconstruction unit which generates a pose parameter based on the readjusted part-attentive feature.

11. The device of claim 10, wherein the part-attentive feature generation unit:
    samples the part index map based on center information extracted from the body center map, generates the part-attentive feature through a matrix product operation based on a sampled part index map and the body part map.

12. The device of claim 11, wherein:
    the part-attentive feature generation unit adjusts a number of channels of the sampled part index map according to the number of channels of the body part map when the number of channels of the part index map is different from the number of channels of the body part map.

13. The device of claim 10, wherein:
    the part-attentive feature readjustment unit performs first readjustment and second readjustment for the part-attentive feature,
    the first readjustment is performed based on a matrix product operation between the part-attentive feature and the parameter map, the second readjustment is performed based on the matrix product operation between the part-attentive feature and the parameter map that a number of channels is adjusted.

14. The device of claim 13, wherein:
the reconstruction unit includes a pose parameter reconstruction unit which acquires the pose parameter per body part,
a first pose parameter for a first body part is acquired based on the feature map corresponding to the first body part in a first readjusted part-attentive feature acquired by the first readjustment.

15. The device of claim 14, wherein:
the first pose parameter is acquired by projecting the feature map onto a linear layer corresponding to the first body part.

16. The device of claim 14, wherein:
when a parent body part of the first body part (hereinafter, referred to as a second body part) exists,
the first pose parameter is acquired by further using a second pose parameter of the second body part.

17. The device of claim 16, wherein:
the first pose parameter is acquired by combining the second pose parameter with the feature map corresponding to the first body part and projecting it onto a linear layer corresponding to the first body part.

18. The device of claim 14, wherein:
the reconstruction unit further includes a shape parameter reconstruction unit which acquires a shape parameter based on a second readjusted part-attentive feature acquired by the second readjustment.

* * * * *